United States Patent
Sharma et al.

(10) Patent No.: US 12,259,943 B2
(45) Date of Patent: Mar. 25, 2025

(54) SYSTEMS AND METHODS FOR OPTIMIZING AND HARMONIZING SEQUENCES OF COMMUNICATIONS OVER DIFFERENT MEDIUMS

(71) Applicant: Accenture Global Solutions Limited, Dublin (IE)

(72) Inventors: Sanjay Sharma, New Delhi (IN); Nilesh Kumar Gupta, New Delhi (IN); Elfin Garg, New Delhi (IN); Rohan Aggarwal, Delhi (IN); Akriti Agrawal, Gurugram (IN)

(73) Assignee: Accenture Global Solutions Limited, Dublin (IE)

( * ) Notice: Subject to any disclaimer, the term of this patent is extended or adjusted under 35 U.S.C. 154(b) by 924 days.

(21) Appl. No.: 17/376,030

(22) Filed: Jul. 14, 2021

(65) Prior Publication Data
US 2023/0015574 A1    Jan. 19, 2023

(51) Int. Cl.
*G06F 17/18* (2006.01)
*G06N 5/04* (2023.01)

(52) U.S. Cl.
CPC ............... *G06F 17/18* (2013.01); *G06N 5/04* (2013.01)

(58) Field of Classification Search
CPC .................................. G06F 17/18; G06N 5/04
See application file for complete search history.

(56) References Cited

U.S. PATENT DOCUMENTS

2021/0397497 A1* 12/2021 Tiwari .................. G06N 20/00

* cited by examiner

*Primary Examiner* — Brian Whipple

(57) ABSTRACT

Aspects of the present disclosure provide systems, methods, and computer-readable storage media that support optimization of communications transmitted over a plurality of communication mediums. Historical communications data may be analyzed to identify clusters of users and a model may be constructed based on the clusters. Candidate sequences of communications over a period of time (e.g., sequences of communication successfully triggering events) are identified using metrics (e.g., probabilities, attribution penalties, etc.) derived from the model or other information. The candidate sequences of communications may be determined at a group or cluster level and then tuned or optimized (e.g., using transition sequences, harmonization, entity priors, etc.) for individual users to produce optimized sequences of communications. The optimized sequences of communications may then be transmitted to individual users according to each user's optimized sequence of communications. A feedback loop may be utilized to update the model or optimizations of future sequences of communications.

20 Claims, 5 Drawing Sheets

SYSTEMS AND METHODS FOR OPTIMIZING AND HARMONIZING SEQUENCES OF COMMUNICATIONS OVER DIFFERENT MEDIUMS

TECHNICAL FIELD

The present disclosure relates generally to communication systems and more specifically to systems and methods for optimizing sequences of communications for transmission via different communication channels or mediums.

BACKGROUND

As use of communication devices and networks has expanded, the complexity of communication systems and interactions over different communication channels or mediums has become more complex. For example, early communication technologies providing Internet access were primarily limited to personal or laptop computing devices and mobile communication devices were limited to voice communication. As technology advanced and access to communication networks and services expanded, so too did the mediums or channels through which users access data and voice networks. For example, users may currently access both voice and data communication networks from mobile devices, wearable devices (e.g., smartwatches, etc.), personal computing and laptop computing devices, or other types of devices (e.g., gaming consoles, tablet computing devices, vehicles, and the like). Moreover, interaction between these different types of devices and networks have become seamless, such that a user may access services without disruption or degradation regardless of the type of device being used (e.g., smartphone versus personal computer) or the different devices involved in the access (e.g., mobile devices, computers, servers, cloud resources, and the like).

This expansion of network capabilities and the devices and systems that support those capabilities has resulted in more complex communication networks and interfaces that enable different types of networks (e.g., cellular voice and data networks) to communicate with each other (e.g., via gateways, etc.). While the above-described improvements to network technologies and network-enabled devices have increased the complexity of network technologies and the devices they support, they have also significantly improved the way that people communicate with each other, consume and distribute content, and access various types of services (e.g., video and music streaming services, shopping services, and the like). With the broad array of available communication channels (e.g., social media channels, e-mail, voice, in-person meetings, etc.) it may be difficult to determine the best communication channels for efficiently communicating information to different users, especially since the available communication channels may be utilized differently by different users (e.g., some users may utilize a first set of communication channels while other users utilize a different set of communication channels). This can present a challenge to enterprises or other individuals and groups (e.g., members of a workforce, vendors, etc.) with respect to determining how to effectively distribute data to users effectively using available network technologies and communication channels. Moreover, a one-size fits all or fits most approach may be inefficient due to differences that may exist for each individual user and how those users consume information via available communication channels or mediums.

SUMMARY

Aspects of the present disclosure provide systems, methods, and computer-readable storage media that support optimization of communications transmitted over a plurality of communication mediums. Information associated with prior communications transmitted to users may be stored as historical communications data. The historical data may be utilized to identify clusters or groups of users. For example, users may be assigned to groups or clusters based on the types of communications they have received, user responses to communications, demographic information, preferences, or other data points. The groups or clusters derived from the historical communication data may be used to construct a model. In some aspects, the model may be a decomposition model that provides insights into the impact of communications on users over time. One or more metrics may be derived from the model. For example, the metrics may include a half-life for communications, communication weights, success intervals associated with desired outcomes, or other types of metrics.

Metrics derived from the model may be utilized to identify candidate sequences of communications over a window or period of time, such as sequences of communication that successfully triggered an event within the period of time. The metrics and sequences of communications determined based on the period of time may be used to calculate probabilities that indicate a likelihood that events will occur as a result of particular communications within a sequence of communications or that the events will occur in the absence of any communications. The metrics may also include an attribution penalty that associates the impact of a communication that triggers an event to one or more prior communications in the sequence of communications. Recommended sequences of communications may be determined based on the metrics (e.g., probabilities and the attribution penalty). The recommended sequences of communications may represent sequences of communications derived based on aggregate communications associated with a particular cluster or group of users and their historic communications.

Since the (initial) recommended sequences of communications are determined based on clusters or groups of users and their associated communications, the recommended sequences of communications may not be optimized for each individual user. Various operations may be utilized to tune or optimize the recommended sequences of communications for individual users to produce optimized sequences of communications. These optimizations, also referred to as hyper personalization, may be based on a set of rules, a set of constraints, or both. Additionally, the hyper personalization may be done in the form of accommodating real time events from external or existing programs. Once the optimized sequence of communications is determined, one or more communications may be transmitted to the users. In some aspects, a feedback loop may be provided. The feedback loop may be used to update the model, the optimizations, or other processes to improve future sequences of communications transmitted in accordance with the present disclosure.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, and computer-readable storage media that support optimization of communications transmitted over a plurality of communication mediums. Historical communications data may be analyzed to identify clusters of users and a model may be constructed based on the clusters. In some aspects, the model may be a decomposition model and may provide insights into the decaying impact of communications over time or other insights with respect to the historical communications corresponding to each cluster. Metrics derived from the model may be utilized to identify candidate sequences of communications through optimal windows over a period of time, such as sequences of communication that successfully triggered an event. The metrics may include probabilities that events will occur as a result of particular communications within a sequence of communications or that the events will occur in the absence of any communications. The metrics may also include an attribution penalty that associates the impact of a communication that triggers an event to one or more prior communications in the sequence of communications, a communication frequency associated with how often a communication is provided to a user over a period of time, and a time interval between successive communications. One or more recommended sequences of communications representing sequences of communications derived based on aggregate communications associated with a particular cluster or groups of users may be determined based on the metrics (e.g., the probabilities and the attribution penalties). Because the recommended sequences of communications are determined on a cluster-by-cluster basis, the candidate sequences of communications may not be optimized for each individual user within a corresponding cluster. Tuning or optimization may be performed on the recommended sequences of communications to optimize the sequences of communications on an individual user basis to produce optimized sequences of communications, which may subsequently be transmitted to individual users. The optimizations may be based on a set of rules, a set of constraints, or both. A feedback loop may be utilized to update the model, improve the optimization processes, or other improvements configured to create more impactful sequences of communications.

Figure 1:
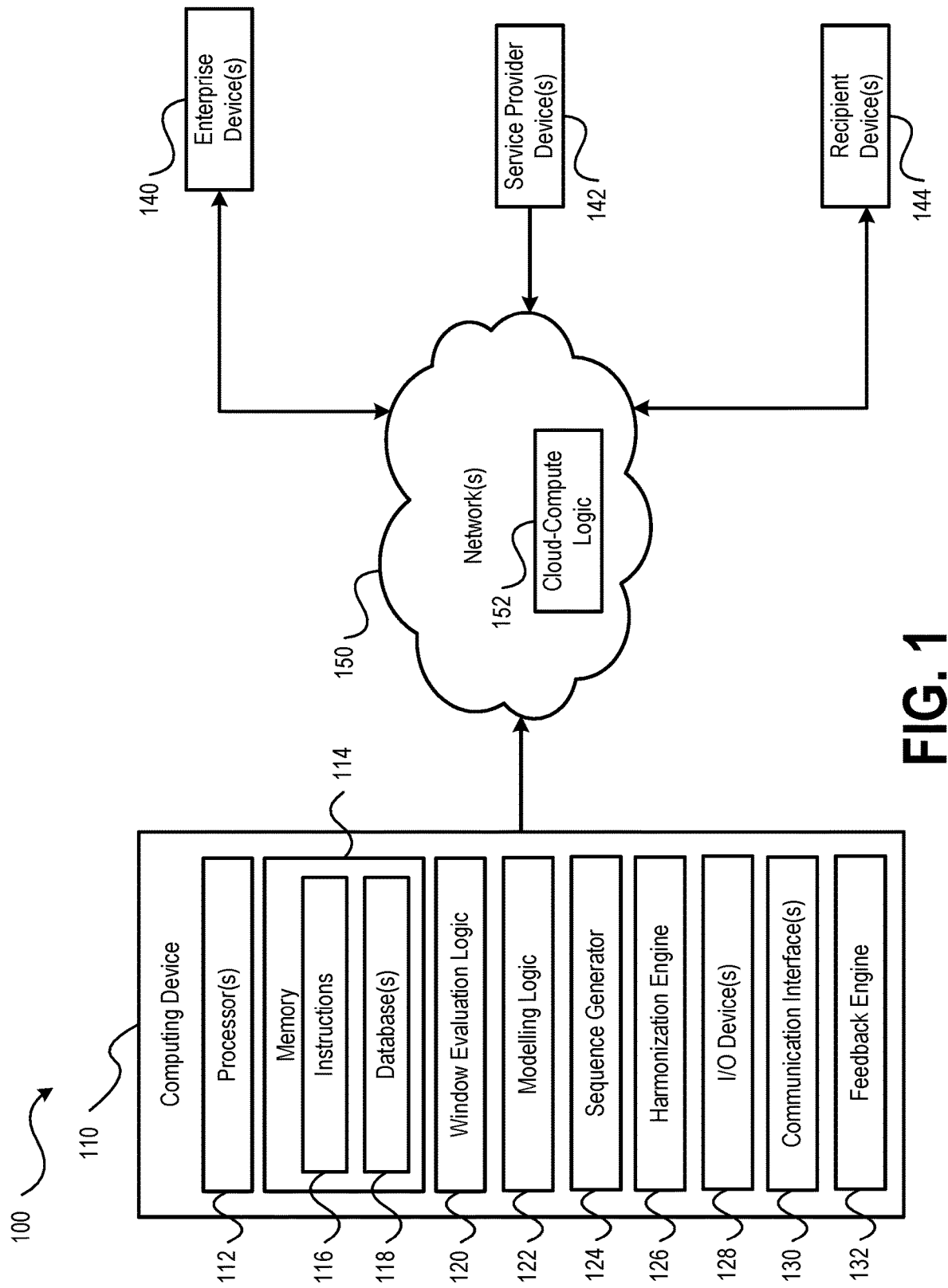
FIG. 1 is a block diagram of an example of a system that supports multi-channel communication optimization in accordance with aspects of the present disclosure.

Referring to FIG. 1, a block diagram of an example of a system that supports multi-channel communication optimization in accordance with aspects of the present disclosure is shown as a system 100. The system 100 may be configured to optimize communications provided to users via a variety of communication channels, such as e-mail communications, voice communications, short messenger service (SMS) communications, multimedia messaging service (MMS) communications, and the like. In aspects, optimization of the communications and communication channels may involve determining a sequence of communications, where the sequence of communication may establish an order for providing a communication to each of the users via different ones of the available communication channels. The particular sequence determined for each user may be optimized to improve the impact of a communication with respect to the recipient or user. For example, the system 100 may determine, for a particular user, that a voice communication should be made "x" times, followed by "y" e-mail communications, and then "z" SMS or MMS communications, but for another user "a" e-mail communications should be attempted, followed by "b" SMS or MMS communications, and then "c" voice communications. Exemplary aspects of optimization and sequencing of communications over different communication channels by the system 100 are described in more detail below.

As shown in FIG. 1, the system 100 includes a computing device 110 communicatively coupled to one or more enterprise devices 140, one or more service provider devices 142, and one or more recipient devices 144 via one or more networks 150. The one or more enterprise devices 140 may be associated with a corporation or other type of business or organization, a department or business unit, members of a workforce, etc. that may desire to transmit communications to the intended recipient devices 144. The one or more service provider devices 142 may be associated with service providers or vendors that create content for communications independently or on behalf of operators of the one or more enterprise devices 140, or that transmit communications generated by third parties (e.g., communications generated by the one or more enterprise devices 140). The recipient device(s) 144 may be devices (e.g., smartphones, personal computing devices, laptop computing devices, personal digital assistant (PDA) devices, tablet computing devices, and the like) associated with users or individuals and may receive communications that have been optimized for each user individually via operations of the system 100. As described in more detail below, the computing device 110 may be configured to optimize communications for transmission to the one or more recipient devices 144, where the communications may be generated by the one or more enterprise devices 140 or the one or more service provider devices 142. For example, the computing device 110 may be configured to optimize internal communications for an operator(s) of the enterprise device(s) 140 (e.g., communications transmitted to user devices associated with employees of the enterprise operator), communications sent to individuals associated with one or more of the recipient devices 144 (e.g., communications external to the enterprise, such as customers or individuals meeting a set of demographic targets), or other types of communications involving interactions between the enterprise devices 140 and/or the service provider devices 142 to configure communications intended for transmission to users associated with the one or more recipient devices 144. Exemplary types of communications and other aspects of the system 100 are described in more detail below.

The computing device 110 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The computing device 110 includes one or more processors 112, a memory 114, one or more input/output (I/O) devices 128, and one or more communication interfaces 130. In some implementations, one or more of the components may be optional (e.g., the I/O devices 128), one or more additional components may be included in the computing device 110, or both. It is noted that functionalities described with reference to the computing device 110 are provided for purposes of illustration, rather than by way of limitation and that the exemplary functionalities described herein may be provided via other types of computing resource deployments. For example, in some implementations, computing resources and functionality described in connection with the computing device 110 may be provided in a distributed system using multiple servers or other computing devices, or in a cloud-based system using computing resources and functionality provided by a cloud-based environment that is accessible over a network, such as cloud-computing logic 152 associated with the one of the one or more networks 150. To illustrate, one or more operations described herein with reference to the computing device 110 may be performed by one or more servers or the cloud-computing logic 152 that communicates with one or more other devices.

The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the computing device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 110 may be stored in the memory 114 as instructions 116 that, when executed by the one or more processors 112, cause the one or more processors 112 to perform the operations described herein with respect to the computing device 110, as described in more detail below. Additionally, the memory 114 may be configured to store data and information at one or more databases 118. In some aspects, the one or more databases 118 may store historical communications data. Exemplary aspects of the historical communications data are described in more detail below.

In some implementations, the computing device 110 includes one or more input/output (I/O) devices 128. The I/O devices 128 may include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 110. In some implementations, the computing device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 110. The computing device 110 may also include one or more communication interfaces 130, which may be configured to communicatively couple the computing device 110 to the one or more networks 150 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like).

As additionally shown in FIG. 1, the computing device 110 may also include window evaluation logic 120, modelling logic 122, sequence generator 124, a harmonization engine 126, and a feedback engine 132. The window evaluation logic 120 and the modelling logic 122 may be configured to analyze historical communications to identify various metrics associated with communication touchpoints. For example, the one or more databases 118 may include historical data that includes previous communications to users delivered via multiple communication channels (e.g., voice, e-mail, SMS, MIMS, instant messages, in-person visits, and the like). These historic communications may be analyzed by the sequencing logic to produce an impact composition model. The impact composition model may provide information regarding the impact that communications have on recipients. As a non-limiting and illustrative example, communications corresponding to a marketing or sales campaign may be intended to influence a user to make a purchase or other action and the impact decomposition model may provide insights into how different communications impact different users. Once the impact decomposition model is constructed, the window evaluation logic 120 may be configured to analyze the impact decomposition model or metrics derived from the impact decomposition model to identify historical sequences of communications over time and the effectiveness of those communication sequences over time. In some aspects, the window evaluation logic 120 may break down a long continuous sequence of communications into smaller components. For example, a sequence of communications spanning a period of time of 32 weeks may be broken down by the window evaluation logic 120 into 8 different sequences of communications, each of the different sequences of communications corresponding to a different 4 week time window within the 32 week time period. It is noted that using the window evaluation logic 120 to break down communications over a 32 week period of time into 8 sequences of communications corresponding to different 4 week periods (of the 32 week period) has been provided for illustration, rather than by way of limitation and that the window evaluation logic 120 may break sequences of communications down based on longer or shorter time windows (e.g., 1 day time windows, 1-5 day time windows, 1 week time windows, two week time windows, 3 week time windows, or even 1 or month long time windows) depending on the particular configured of the window evaluation logic 120, the system 100, and the sequences of communications available for analysis by the window evaluation logic 120.

Figure 2:
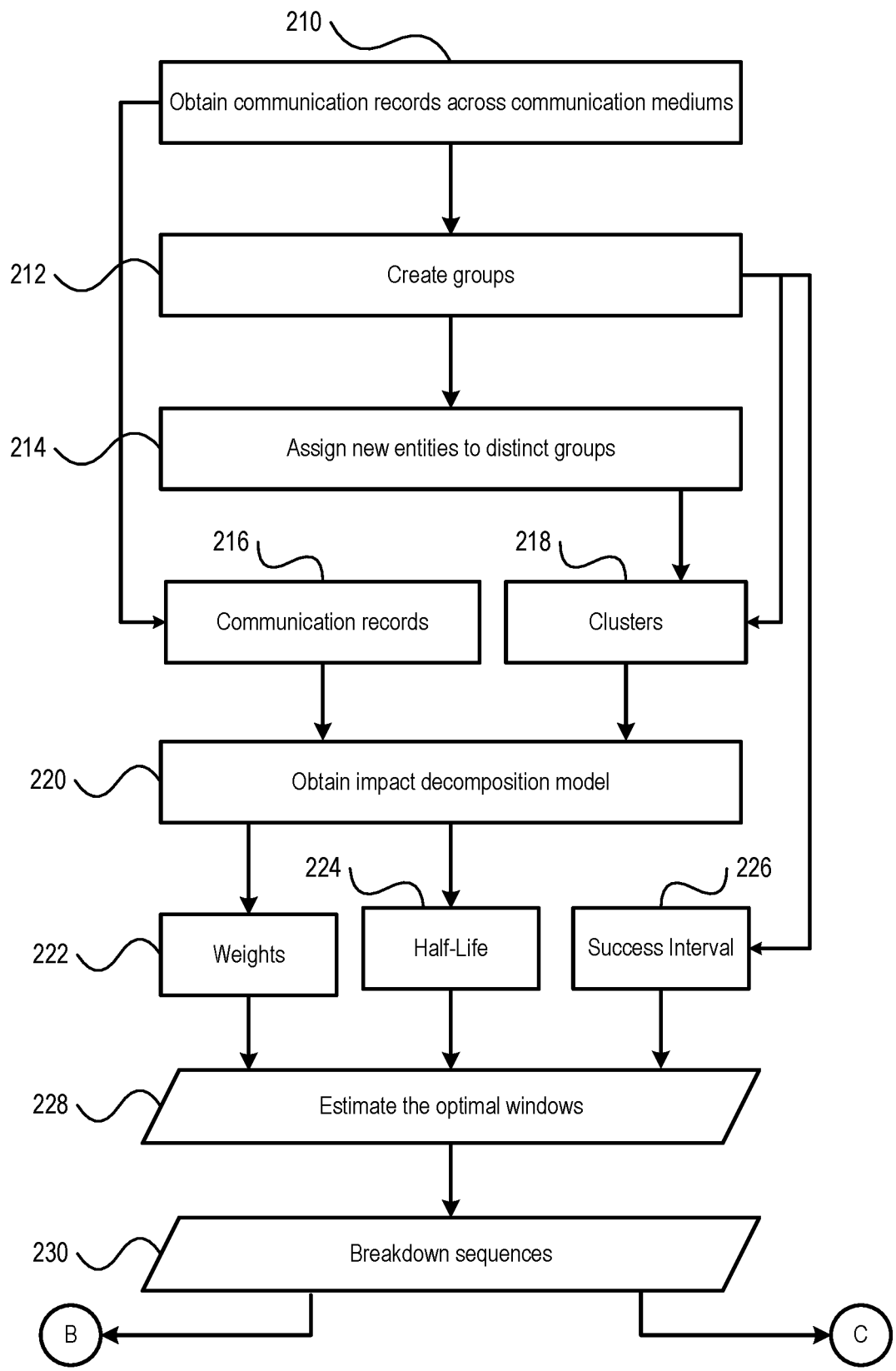
FIG. 2 shows a flow diagram illustrating exemplary operations to optimize communication sequences in accordance with aspects of the present disclosure.

The above-described operations of the window evaluation logic 120 and the modelling logic 122 may be utilized to derive optimized communication sequences by breaking down historical communication sequences that may be analyzed or evaluated based on probabilities of success or other metrics. A non-limiting example of the above-described operations is shown in FIG. 2, which is a flow diagram illustrating exemplary operations to optimize communication sequences in accordance with aspects of the present disclosure is shown. In an aspect, the flow of FIG. 2 may be performed by a computing device, such as the computing device 110 of FIG. 1, and more specifically, the window evaluation logic 120 and the modelling logic 122 of FIG. 1. As shown in FIG. 2, at 210, records for one or more entities (e.g., users or recipients of communications) may be obtained (e.g., from the one or more databases 118 of FIG. 1 or another source, such as one of the one or more enterprise devices 140, the one or more service provider devices 142, or the one or more recipient devices 144). The records may include information regarding communications across a variety of different communication mediums or communication channels (e.g., e-mail communications, voice communications, SMS or MMS communications, in-person communications, and the like). The records may include timestamps that indicate when the communications occurred, information regarding a duration of the communication (e.g., a duration of a voice communication, etc.), communication status information (e.g., whether an e-mail communication was returned undeliverable, whether an SMS or MMS communication was delivered and/or read by a recipient, and the like), or other types of information (e.g., whether the communication was associated with a campaign, whether a communication resulted in a sale of a product by a recipient of the communication, and the like). For example, the records may include information about communications to customers as part of an advertising/marketing campaign designed to generate sales for a product. In some aspects, the records may also include information regarding an origination of the communications. For example, communications may be originated automatically using automated voice response (AVR) systems, automated text communication systems, by individuals (e.g., a sales representative, a vendor, a field agent who contacts individuals personally, etc.), in response to an inquiry from a user or customer, and the like. It is noted that the exemplary types of communications and origination sources described above have been provided for purposes of illustration, rather than by way of limitation and that other types of communications or communications for other purposes may be analyzed according to the concepts disclosed herein.

As shown at 212, one or more groups may be created based on the records. The one or more groups may be created based on attributes derived from the records obtained at 210. For example, attributes regarding whether communications are associated with marketing, sales, product preferences, and the like may be determined for each recipient of a pool of recipients, and any variation in the attributes across different members of the pool of recipients may be analyzed to create distinct groups. Each group may include communications and other information associated with similar characteristics or attributes (e.g., recipients purchasing the same or similar products, recipients having similar demographics, etc.). It is noted that while the records obtained at 210 and the groups established at 212 may be determined based on information associated with recipients for which historical data (e.g., the records obtained at 210) is available, in some aspects recipients for which no historical data is available may also be evaluated and incorporated into the groups. For example, at 214, users for which limited or no historical communication data is available may be incorporated or assigned to the one or more groups created at 212. In an aspect, the users incorporated into or added into the groups at 214 may be assigned to different ones of the groups based on various types of data that may be available, such as demographic information (e.g., customer demographic information), specialties (e.g., specialization in a particular field or product), qualifications, or other types of accessible information associated with those users. For example, a user may be added to a particular group based on the user having similar demographics to users assigned to one of the groups established at 212, while another user may be added to a group based on one or more users of the group having specialties or qualifications similar to the other users of the group. In some aspects, the groups may be established using one or more clustering algorithms (e.g., k-means, DBSCAN, expectation maximization, mean shift, hierarchical, Euclidian Distance (ED), etc.).

As shown at 220, the communication records 216 (obtained at 210) and the clusters or groups 218 (determined at 212, 214) may be utilized to generate an impact decomposition model. As described above with reference to FIG. 1, the impact decomposition model may be created using entity level data (e.g., data corresponding to each user in a particular group). For example, the entity level data may include sales data, communication data associated with targeted communications (e.g., voice communications, e-mail communications, SMS or MMS communications, and the like) via different communication channels across products, information associated with an outcome of a communication (e.g., a sale, a conversion, etc.), or other types of relevant information. As a non-limiting example, the decomposition model may be represented as:

$$Y_n = \alpha + \beta_1 X_{1n} + \beta_2 X_{2n} + \ldots + \varepsilon,$$

where $Y_n$ is total sales for a product for an $n^{th}$ user, $X_{1n}$, $X_{2n}, \ldots$ represents activity corresponding to distinct communication channels for the $n^{th}$ user, and $\alpha, \beta_1, \beta_2, \ldots$ represents the impact of each communication channel on sales. It is noted that while decomposition model illustrated in the equation above is described with references to sales, embodiments of the present disclosure are not limited to use cases involving sales. Thus, it is to be understood that the concepts disclosed herein may be readily applied to other types of situations and use cases involving sequences of communications.

Using the impact decomposition model and the clusters or groups, a set of metrics may be determined. The set of metrics may include one or more weights 222, a half-life 224, and a success interval 226. The one or more weights 222 may be associated with different communication channels or mediums and may represent the volume of communications for each communication channel. In some aspects, the one or more weights 222 may be computed using the proportion of impact of each communication channel on total sales/conversion (or another desired outcome associated with the communications) in a certain time period. The half-life 224 may indicate decaying benefit of successive communications over time. To illustrate, the impact of a communication that users receive on a particular day may be impacted by two factors: any previous communications relating to the same subject matter and the ability of the user to recall the previous communication(s). Thus, the half-life metric 224 may indicate a recall of the user (i.e., the ability of a user to be impacted by a current received communication based on a previous communication). It is noted that recall may be different for different users. Thus, the ability to calculate the half-life may enable a more granular approach or evaluation of the impact of communications on users. In some aspects, the half-life 224 may be calculated using the sales decomposition model by estimating the average recall duration for each communication channel. The success interval 226 may include information associated with events (e.g., sales, conversions, clicks, requests for information, etc.) resulting from particular communications. In some aspects, the success interval 226 may represent the time interval between two consecutive successes (e.g., consecutive conversion, sales, clicks, etc.).

An optimal window for achieving a particular outcome may be estimated based on the half-life metrics 224, the weights 222, and the success interval 226 for each of the different groups or clusters. For example, the half-life metrics 224 may indicate when particular communications or communication channels are no longer beneficial (e.g., a reduced likelihood of success in achieving the desired outcome), the weights 222 may indicate which communication channels or sequences of communications over the communications should be used to achieve the desired results, and the success intervals 226 may indicate the duration of the path or the journey of the sequence to be followed to achieve the desired results over time. For example, the success interval 226 may indicate a duration of a path or journey for a sequence of communications resulting in a desired outcome (e.g., the path or journey may involve 2 voice communications, followed by an e-mail communication, followed by an in-person communication). Thus, the flow of FIG. 2 may provide an analytical framework for evaluating and determining optimal strategies for transmitting communications, rather than relying on heuristic methods as in currently systems.

While estimating optimal windows for achieving desired outcomes has been conceptually described above, estimation of optimal windows in accordance with aspects of the present disclosure may also be represented mathematically. For example, for the $j^{th}$ cluster, which may include entities or recipients k=1, 2, . . . , n), the optimal window $WE_j$ may be estimated according to:

$$WE_j = \Sigma_{i=1}^{n}[HL_{ij} * W_{ij}] + S_j * W_{sj}$$

where, $\Sigma_{i=1}^{n}[HL_{ij} * W_{ij}] = HJ_{1j} * W_{1j} + HL_{2j} * W_{2j} + \ldots + HL_{nj} * W_{nj}$; $HL_{ij}$ is the time estimated for half-life of an event of the $i^{th}$ channel for the $j^{th}$ cluster; $W_{ij}$ is the weight of the $i^{th}$ channel for the $j^{th}$ cluster, calculated basis incremental contribution derived from the impact decomposition model; and $S_j = 1/n \ \Sigma_{k=i}^{n} S_k \{[(S_{k2}-S_{k1})+(S_{k3}-S_{k2})+ \ldots +(S_{kn}-S_{k(n-1)})]/(n_k-1)\}$; $(S_{kn}-S_{k(n-1)})$ is time interval between $n^{th}$ and $(n-1)^{th}$ success of $k^{th}$ entity of the $j^{th}$ cluster; $n_k$ is the number of successes for the $k^{th}$ entity; and $W_{sj}$ is the weight of successes for the $j^{th}$ cluster. In an aspect, $W_{sj}$ may be calculated based on a base contribution (e.g., success in achieving desired outcome despite lack of marketing, minimal communications, etc.), which may be derived from the impact decomposition model.

As shown above both conceptually and mathematically, the optimal window(s) estimated at 228 may be computed for each cluster. In contrast to currently used techniques for optimizing communications, which are based on heuristic methods, the above-described techniques provide an analytical framework for optimizing communications that may more effectively take into account how communications via different communication channels impact the desired outcomes over time. At 230, communications may be broken down into multiple sequences (e.g., using the optimal window(s) determined at 228) and the sequences may be utilized to calculate the probabilities of success. For example, the communications may be broken into multiple sequences of smaller time durations, which may enable identification of relevant or significant sequences, which may be used for probability computation, as well as configuration of one or more thresholds, as described in more detail below. As shown in FIG. 2, the sequences generated at 230 may be utilized in further processes, as indicated by processing "B", described in more detail with reference to FIGS. 1 and 3, and by processing "C", described in more detail with reference to FIGS. 1 and FIG. 4, described in more detail below.

Referring back to FIG. 1, the exemplary operations described and illustrated with reference to FIG. 2 may be performed by the window evaluation logic 120 and the modelling logic 122. For example, the modelling logic 122 may construct the impact decomposition model (e.g., as described with reference to blocks 210-220 of FIG. 2) and the window evaluation logic 120 may determine the above-described windows and then break down the windows into multiple sequences of communications (e.g., as described with reference to blocks 228-230 of FIG. 2). It is noted that while FIG. 1 illustrates the window evaluation logic 120 and the modelling logic 122 as being separate components or modules, such depiction has been provided for purposes of illustration, rather than by way of limitation and the functionalities described with respect to the window evaluation logic 120 and the modelling logic 122 may be provided by a single component of module or via more than two modules.

As described above with reference to FIG. 2, additional processing may be performed based on the outputs generated by the window evaluation logic 120 and the modelling logic 122. The additional processing may be configured to optimize communications over multiple communication channels based on the model(s) and sequences of communications. For example, the sequence generator 124 may analyze the model(s) and/or the sequences of communications within the window(s) to determine various types of information associated with the sequences of communications. As non-limiting examples, the information associated with the sequences of communications may include metrics, such as coefficients associated with the communications, and response curves may be derived from the model(s) and/or the sequences of communications. The information associated with the sequences of communications may then be utilized to configure communications transmitted to various users. In particular, the sequence generator 124 may utilize the information associated with the sequence of communications to generate a sequence of actions that may be recommended to promote or increase the likelihood of a desired outcome.

Figure 3:
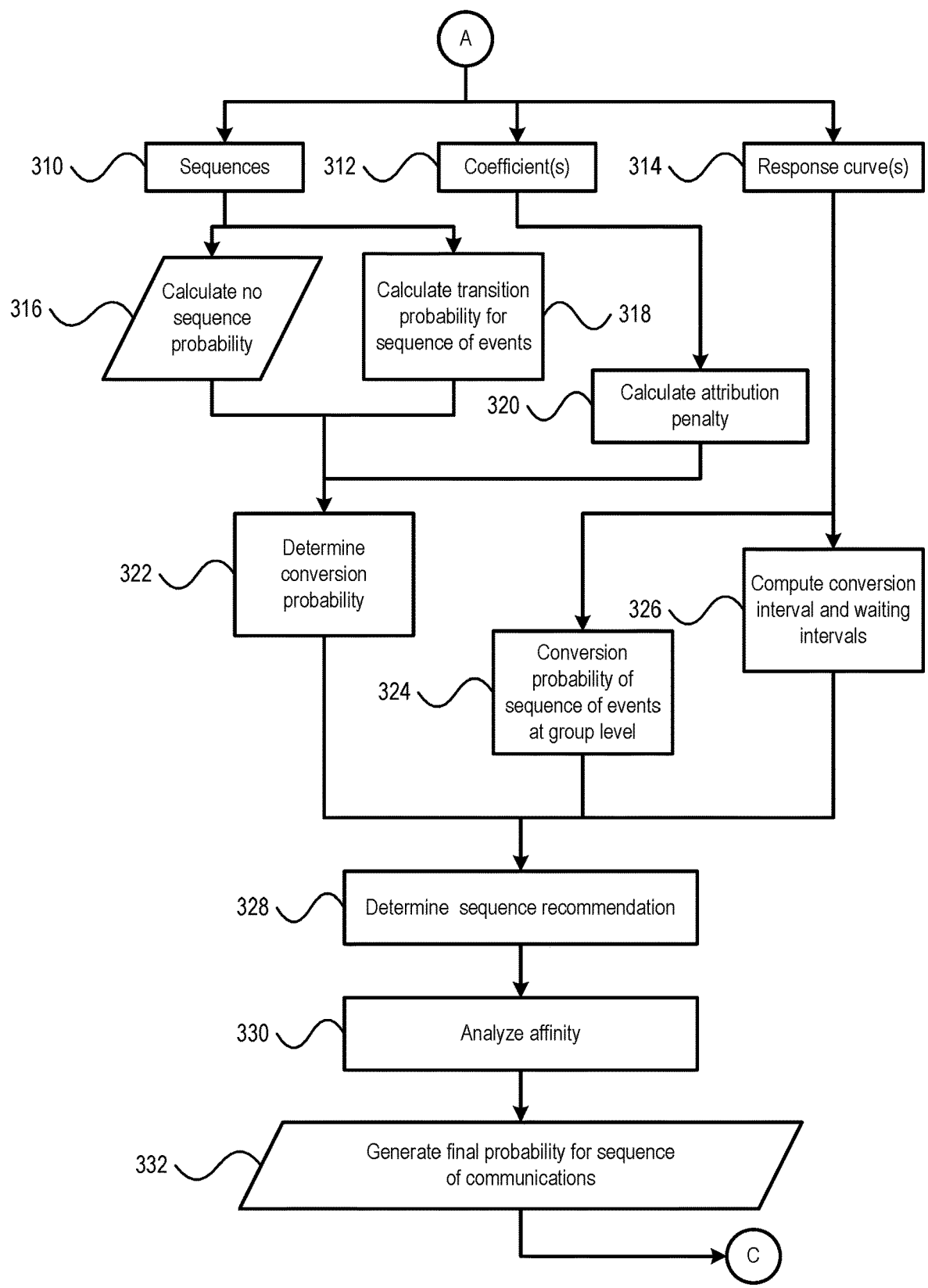
FIG. 3 is a flow diagram illustrating exemplary operations to optimize communication sequences in accordance with aspects of the present disclosure.

For example and referring to FIG. 3, a flow diagram illustrating exemplary operations to optimize communication sequences in accordance with aspects of the present disclosure is shown. In FIG. 3, reference "A" corresponds to the path of FIG. 2 that transitions to "B". Using the windows determined by the window evaluation logic 120 and the model(s) obtained from the modelling logic 122, a set of sequences may be determined, at block 310, one or more coefficients may be calculated, at block 312, and one or more response curves may be calculated, at block 314. The sequences determined at 310 may correspond to sequences of communications over one or more communication channels during one of the identified windows. The coefficient(s) may correspond to the impact of a communication on overall desired outcome (e.g., sales, conversion, clicks, etc.) at a cluster or group level. The response curves calculated from the model(s) at block 314 may be indicate the incremental impact of communications on users and may be utilized to place limits on particular communications. For example, a response curve for a first user or entity may indicate that the first user will positively (or negatively) respond to 5 or more communications (e.g., communications of a particular type, such as voice communications) within a time period (e.g., 5 or more telephone calls within a month, 5 or more e-mails within a month, etc.), while a response curve for a second user or entity may indicate that the second user will positively (or negatively) respond to 3 or more communications within the period of time. Thus, the response curves may indicate, at the user or group level (e.g., a group of users), a number of communications that may be provided to a user and/or a number of communications that may negatively impact the user. The number of communications of a particular type that may be provided to a user before a negative impact is realized may be configured as a threshold.

In some aspects, as shown at 316, a no sequence probability may be calculated based on the sequences determined at 310. Traditional systems may assume that without a sequence of communications nothing happens and so the probability of success in the absence of communications and/or communications sequences is zero. However, calculating the no sequence probability may take into account the fact that some users may take actions regardless of whether communications are or are not sent/received. Thus, the no sequence probability may indicate the probability that a desired outcome may occur in the absence of a communication or sequence of communications. In addition to calculating the no sequence probability, a transition probability for a sequence of events may be calculated, at 318. Unlike the no sequence probability, the transition probability may indicate the probability that the desired outcome will occur as a result of a sequence of events.

At 320, an attribution penalty may be calculated based on the coefficients determined at 312. The attribution penalty may be configured to reallocate impact among different communication channels that may be incorrectly attributed to a particular communication channel. For example, in a sales setting it may be assumed that the last communication received a user prior to a sale was the driving force that prompted the sale. However, such assumptions may improperly fail to take into account the impact of any previous communications in the sequence of events (e.g., an email that prompted a telephone call from which a sale was made). The attribution penalty may be configured to reallocate or attribute at least some of the impact of a particular communication to another communication in the sequence of communications, thereby taking into account the combinatory impact that sequences of communications may have on users. By utilizing the attribution penalty, embodiments of the present disclosure may more accurately evaluate a sequence of communications and the impact that each different communications within the sequence of communications has on a user. It is noted that while termed an attribution "penalty," the term penalty should not be understood to imply only reductions to the evaluation of the impact that communications have on users. For example, where an attribution penalty is calculated between two communications, the impact of one of the communications (e.g., the latter of the two communications) may be reduced while the impact attributed to the other communication (e.g., the earlier of the two communications) may be increased.

The no sequence probability and the transition probability may be utilized to calculate a probability for sequence of events, at 322. The probability for sequence of events calculated at 322 may indicate the probability of achieving the desired outcome via a sequence of communications while taking into account the fact that the desired outcome may occur in the absence of a sequence of communications. It is noted that the probability of sequence of events calculation may be performed multiple times, each time representing a different sequence of communications. For example, the probability of sequence of events may include a probability of achieving the desired outcome via a sequence of communications that involves one or more communications of a first type (e.g., voice communications, e-mail communications, etc.) and/or that involves two more communication types (e.g., voice and e-mail communications, voice and in-person communication, and the like).

In some aspects, the probability for sequence of events may also be calculated based on the attribution penalty. Calculating the probability for sequence of events based on the attribution penalty may improve the calculated probability or probabilities for sequence of events by taking into account the contribution that preceding communications may have on achieving the desired outcome subsequent to a last communication. For example, suppose that a sequence of communications involves a first communication and a second communication, where the first communication occurs prior to the second communication, and that the desired outcome occurs subsequent to the second communication. As explained above, while the desired outcome may occur subsequent to the second communication, the attribution penalty may associate a portion of the credit for achieving the desired outcome (e.g., because the first communication had an impact on the user's decision to take action based on the second communication). As a result of taking the attribution penalty into account, the probability for sequence of events may more accurately reflect the significance of each communication in the sequence of communications.

The response curves calculated at 314 may be utilized to determine additional metrics that may be utilized to optimize a sequence of communications. For example, as shown at 324, the response curves may be utilized to optimal thresholds for communications, and as shown at 326, computing one or more intervals. The optimal thresholds may be determined to optimize a frequency of communications to improve (e.g., maximize) the probability of success (i.e., achieving the desired outcome) for a given variation in the frequency of communications. To illustrate and as explained above, the response curves may indicate the incremental impact that each communication has on a user (or group of users). The optimal thresholds may correspond to thresholds for providing communications of a particular type or a total number of communications to a particular user (or group of users) that positively impacts the likelihood of achieving the desired outcome. In some aspects, the optimal thresholds may be determined for each communication type, such as a voice communication threshold, an e-mail communication threshold, and the like. In this manner, each difference type of communication may be limited to a number of communication attempts that positively impact the likelihood of achieving the desired outcome without providing too many communications to the user, which may negatively impact the desired outcome. It is noted that where the optimal thresholds are determined at a group level, the threshold(s) may indicate a number of communications (or type of communication) that may be provided to each user in the group individually, such that each user is assumed to have a same or similar optimal threshold for communications or types of communications. However, in some aspects, the optimal threshold for a group may indicate a number of communications that may be provided to the users of the group, collectively, such that the communications to the entire group may be limited by the optimal threshold, rather limiting communication for each individual user of the group individually.

The one or more intervals may include one or more conversion intervals, which may correspond to periods of time to realize the desired outcome an event is triggered. For example, the one or more conversion intervals may indicate that, for a user or group of users, the desired outcome (e.g., a sale of a product, a new subscription, etc.) may occur within a period of time following initiation of a sequence of communications or a particular communication within the sequence of communications (e.g., 3 weeks after the sequence of communication begins or within 5 days of a particular communication of the sequence of communications being sent). The one or more intervals may also include one or more waiting interval, which correspond to periods of time between successive communications. For example, where a user can receive 4 voice communications per month (e.g., based on the optimal threshold(s)), the waiting interval may specify that a second voice communication should not be transmitted until at least 1 week (i.e., ¼ month) after a first voice communication. It is noted that the waiting interval may be specific to a particular type of communication, such as voice communications, such that the system may recommend waiting 1 week between successive voice communications but may send communications to the user over other communication channels or mediums (e.g., e-mail) within that 1 week waiting interval. In some aspects, the waiting interval may be associated with multiple types of communication, such as voice communications, in-person communications, and e-mail communications. In such instances, the waiting interval may specify waiting 1 week between successive voice communications but may send communications to the user over other communication channels or mediums (e.g., e-mail) within that 1 week waiting interval.

It is noted that the above-described metrics (e.g., the probability for sequence of events, the optimal thresholds, and the one or more intervals) may be determined on an individual or group basis. When determined on an individual user basis, the system may determine first probabilities for sequence of events, first optimal thresholds, and first interval metrics for a first user and second probabilities for sequence of events, second optimal thresholds, and second interval metrics for a second user, and so on. When determined on a group basis, the probabilities for sequence of events, the optimal thresholds, and the interval metrics determined by the system may be associated with a group of users, rather than any one user specifically. Determining the metrics on a group basis may enable the metrics to be determined more quickly (e.g., because the calculations can be performed fewer times than would be needed for individual metrics are calculated) and may reduce the computational complexity or requirements of the system. Additionally, utilizing group level analysis may alleviate issues that may arise due to data sparsity at the user level by enabling information for a pool of users to be leveraged for one user (e.g., a user for which little or no information exists).

At 328, one or more candidate sequence recommendations may be determined based on the metrics (e.g., the probability for sequence of events, the optimal thresholds, and the one or more intervals). Each of the one or more candidate sequence recommendations may include a proposed sequence of communications, such as a voice communication followed by an e-mail communication followed by another type of communication (e.g., an in-person communication, a banner communication, and the like). In some aspects, multiple candidate sequence recommendations may be determined, each candidate sequence recommendation being associated with a different sequence of communications. In some aspects, the candidate sequence recommendation(s) may be created at an individual level. For example, each candidate sequence recommendation may be tailored to a specific user. In additional or alternative aspects, the candidate sequence recommendation(s) may be created at a group level. For example, each journey recommendation may be tailored to a specific group of users.

Once created, the candidate sequence recommendation(s) may be evaluated based on affinity information, at 330. The affinity information may utilize individual user preferences to customize the candidate sequence recommendation(s). For example, where the candidate sequence recommendation(s) is determined for a specific user on an individual basis, the affinity information may then be used to optimize the candidate sequence recommendation, which may include changing an order of the communication sequence, the number of communications in the sequence, changing content of the communications, deploying the communications via a delivery mechanism to which the recipient may be more responsive, adjusting or configuring a timing for transmitting the communications (e.g., some users may prefer to receive communications in the morning while others may prefer to receive communications in the evening or another time of day), or other types of modifications. Where the candidate sequence recommendation(s) is determined on a group basis, the candidate sequence recommendation(s) may then be optimized (e.g., changing the order of the sequence of communications, the number of communications, the timing of the communications, etc.) on an individual basis for each user in the group. For example, the affinity optimizations may be based on historical data for each user (e.g., entity prior data associated with prior communications to users), constraints or other requirements (e.g., user preferences, legal constraints, business constraints, etc.), prioritization rules, real-time data, or other types of data. These additional data points may be utilized to rank the optimal sequences of communications and determine content of the communications, as well as determine timing and delivery method optimizations for delivering the communications and content to the intended recipients, as described in more detail below. As a result of the affinity optimizations, a final set of sequence recommendations may be determined.

At 332, a final probability of success may be determined based on the final set of sequence recommendations. The probability of success may take into account a combination of metrics, such as a base probability (e.g., the no sequence of probability calculated at 316) and the transition probability determined at 318, as well as attribution penalties and affinities. The final probability of success may overcome loss of information (e.g., based on the use of the no sequence probabilities and the transition probabilities), eliminate attribution bias (e.g., by accounting for the attribution penalties), and account for hyper-personalized sequences of events (e.g., the final sequence recommendations determined based on the affinities). In this manner, the final probabilities may provide a more accurate understanding of the impact that each final sequence of events may have on users and identify particular sequences of events that improve (e.g., increase, maximize, etc.) the chances that a sequence of communications results in a desired outcome. As an illustrative and non-limiting example, let $Y_n$ be sequence of n events. The final probability may then be calculated according to:

$$Y_n = E_1 \to E_2 \to \ldots \to E_n$$

$$P(S|Y_n) = P(\text{no sequence}) + \sum_n \Delta Y_n \left( \Delta Y_n - 1, \frac{P(S \cap Y_n)}{P(Y_n)}, f(E_n), A(E_n) \right),$$

where, P(no sequence) is the conditional probability of success (conversion) in the absence of any event, $\Delta Y_n$ is the incremental uplift in conversion due to sequence of n events $(E_1 \to E_2 \to \ldots \to E_n)$, $\Delta Y_{n-1}$ is the incremental uplift in conversion due to sequence of n−1 events $$(E_1 \to E_2 \to \ldots \to E_{n-1}), \frac{P(S \cap Y_n)}{P(Y_n)}$$

is the transition probability from $Y_n$ sequence of events to success, $f(E_n)$ is the attribution penalty of $E_n$ on account of other events, and $A(E_n)$ represents the affinities/preferences of a user for event $E_n$.

In some aspects, the base probability (e.g., the no sequence probability) may be calculated according to:

$$P(\text{no sequence}) = \frac{\#(X' \to S)}{\#(X \to S) + \#(X \to S') + \#(X' \to S) + \#(X' \to S')},$$

where S/S' represents a success or failure of the desired outcome, respectively; X/X' indicates the presence or absence of marketing, respectively; and # represents a number of instances or occurrences of a sequence of communications.

In some aspects, the transition probability may represent the probability of a transition from $Y_{(j,n)}^{th}$ sequence of events to success (i.e., achieving the desired outcome). The probability of transition for the $Y_{(j,n)}^{th}$ sequence of events to success for the $j^{th}$ sequence of n events may be represented as $P(S|Y_{(j,n)})$, where $Y_{(j,n)}$ represents the $j^{th}$ sequence of n events, which may be expressed as:

$$Y(j,n) = \{\text{Event}_1 = y_1\} \to \{\text{Event}_2 = y_2\} \ldots \to \{\text{Event}_{n-1} = y_{n-1}\} \to \{\text{Event}_n = y_n\},$$

where $\text{Event}_i$ represents the $i^{th}$ event—marketing channels, and where i=1, 2, 3, ..., m.

In some aspects, the attribution penalty may be calculated based on or derived from the decomposition model. To illustrate, in the non-limiting example above the decomposition model is expressed as $Y_n = \alpha + \beta_1 X_1 + \beta_2 X_2 + \ldots + \varepsilon$, where Y is total sales and $X_1$, $X_2$ are distinct marketing channels. The attribution penalty may be determined based on coefficients obtained from the decomposition model. For example, using the above-equation for the decomposition model, the attribution penalty may be expressed as: $\beta_1 X_1 = \alpha_1 + f(X_1 | X_2, X_3, \ldots, X_n)$, where $\alpha_1$ is the direct impact of $X_1$ on sales and $f(X_1 | X_2, X_3, \ldots, X_n)$ represents the attribution penalty with respect to other marketing channels (e.g., to remove any incorrectly attributed bias).

The affinities (A) of a $k^{th}$ user towards content $m_j^{th}$ of communication over channel $X_i^{th}\{i=1, 2, \ldots, n; m_j = m_1, m_2, \ldots, m_n\}$, may be expressed as $A_k(X_{n1})$, $A_k(X_{n2}), \ldots, A_k(X_{nmn})$, where:

$$A_k(X_{nmn}) = \frac{\text{Engagement of } m_n^{th} \text{ content of } X_n^{th} \text{ channel for } k^{th} \text{ customer}}{\text{Exposure of } mnth \text{ content of } X_n^{th} \text{ channel for } k^{th} \text{ customer}} \Bigg/$$

$$A_k(X_n), \to$$

$$A_k(X_n) = \frac{\text{Engagement of } X_n^{th} \text{ channel for } k^{th} \text{ customer}}{\text{Exposure of } mnth \text{ content of } X_n^{th} \text{ channel for } k^{th} \text{ customer}}.$$

It is noted that the exemplary concepts for calculating the no sequence probability, the transition probability, the attribution penalty, and the affinities shown above are provided for purposes of illustration, rather than by way of limitation and that other techniques or calculations may be utilized in accordance with the concepts disclosed herein.

Once determined, the final probabilities determined at 332 may be utilized to determine optimal sequences of communications. For example, the optimal sequences of communications may be determined based on the probabilities, where each optimal sequence of communications may be associated with a higher probability than one or more other potential sequences of communications. Utilizing the final probabilities to configure the optimal sequences of communications may enable sequences of communications to be tuned for individual users or groups, such as based on affinities, while also taking into account the contribution that each communication in the sequence may have with respect to the desired outcome (e.g., based on the attribution penalty). As shown in FIG. 3, the optimal sequences of communications may be output as a set of sequence recommendations to "C" (described in more detail with reference to FIG. 4).

Referring back to FIG. 1, after generating the optimal sequences of communications, as described with reference to FIG. 3, the sequence generator 124 may output the optimal sequences to the harmonization engine 126. The harmonization engine 126 may utilize information generated by the window logic 120 and the modelling logic 122, as described above with reference to FIG. 2, and the sequencing generator 124, as described with reference to FIG. 3, to generate a final set of sequences of communications configured for delivery to the users. To generate the final set of sequences of communications, the harmonization engine 126 may take into account historical data, constraints or other requirements, prioritization rules, real-time data, or other types of data. These additional data points may be utilized to rank the optimal sequences of communications and determine content of the communications, as well as determine timing and delivery method optimizations for delivering the communications and content to the intended recipients. The ability to perform constraint based evaluation of sequences of communications may improve the overall impact that the communication(s) has. For example, previous systems may determine that there are 5 communications to send to a user and may send all 5 communications. In contrast, the harmonization engine 126 may evaluate the 5 communications based on a set of constraints and determine that only 3 of the communications should actually be sent to the user (e.g., because sending all 5 communications may have a net negative impact on the recipient, violate constraints or rules, or otherwise reduce the likelihood of achieving the desired outcome).

Figure 4:
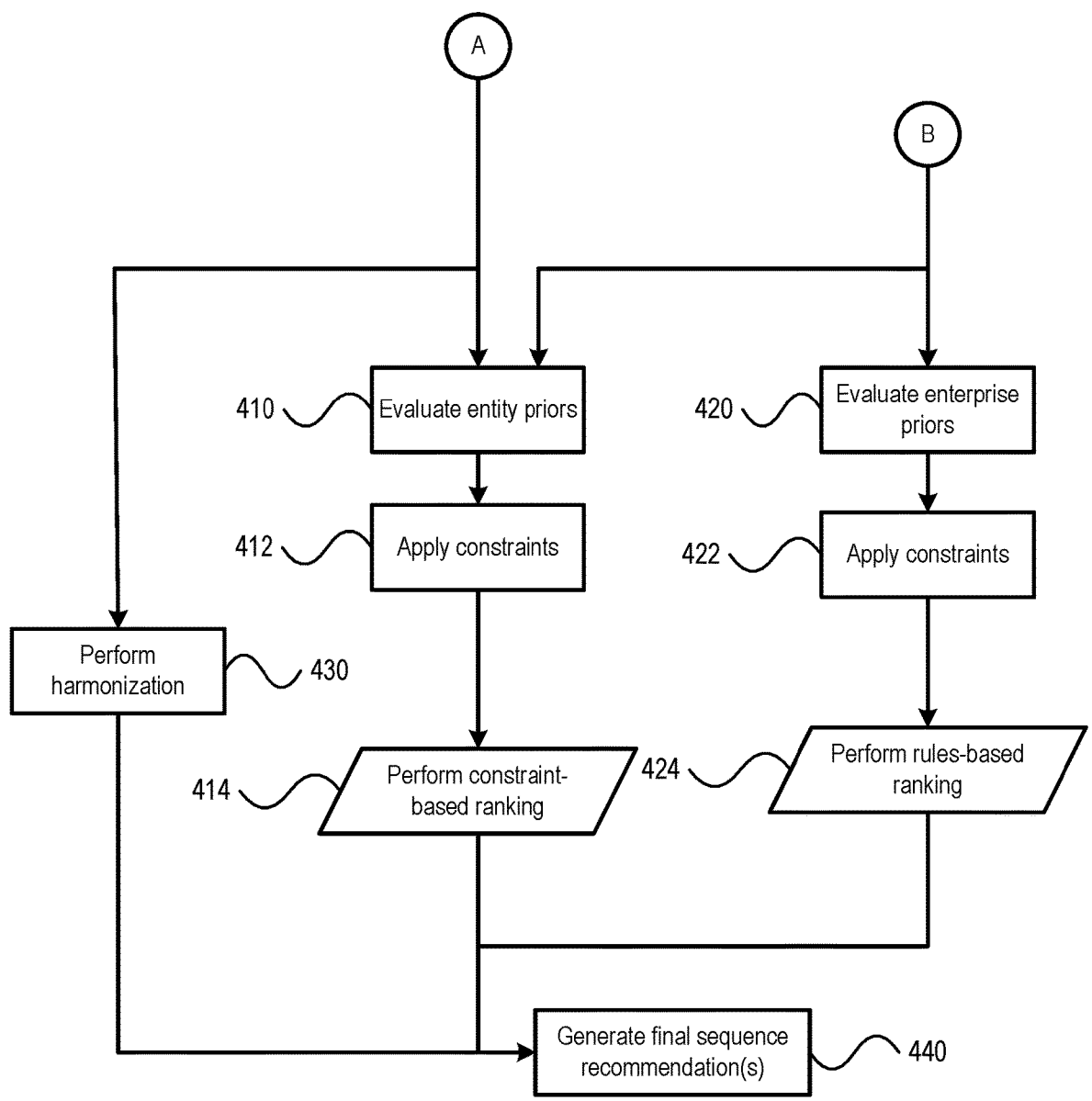
FIG. 4 is a flow diagram illustrating exemplary aspects of performing harmonization of communications in accordance with aspects of the present disclosure.

Referring to FIG. 4, a flow diagram illustrating exemplary aspects of performing harmonization of communications in accordance with aspects of the present disclosure is shown. In an aspect, the flow of FIG. 4 may be performed by the system 100 of FIG. 1 and more specifically, by the harmonization engine 126 of FIG. 1. As described in more detail below, the operations of the flow shown in FIG. 4, which may be performed by the harmonization engine 126 of FIG. 1, may hyper-personalize and harmonize the sequence of communications (e.g., the sequences of communications output by the flow of FIG. 3). Harmonization operations may be configured to prioritize recommendations with respect to the sequences of communications on an individual user/recipient basis while ensuring that constraints associated with the communications are satisfied.

At 410, entity priors may be evaluated. The entity priors may correspond to information derived from historical user engagements (i.e., communications) or user engagement rates, such as historical rates of engagement between a user and communications transmitted by an enterprise (e.g., the one or more enterprise devices 140 of FIG. 1). Additionally or alternatively, the entity priors may include information derived from historical user engagements or user engagement rates associated with engagements between a user and communications transmitted by a service provider (e.g., the one or more service provider devices 142 of FIG. 1). The entity priors may be determined at the group level and then propagated to entity level to set up a controlled environment and limit spamming users with communications. In some aspects, evaluation of the entity priors may include determining constraints based on the entity priors, such as constraints associated with legal constraints (e.g., is the communication permitted or prohibited with respect to particular recipients), opt out constraints (e.g., have any of the intended recipients of a communication opted out of receiving communications from the sender), or other communication restrictions. The determined constraints may also include information regarding a threshold for number of communication for the recipients (e.g., one or more of the recipients may have configured preferences that limit the number of communications received to a threshold number of communications over a period of time). The entity priors may be determined based on information stored in a database (e.g., the one or more databases 118 of FIG. 1 or another source, such as a database associated with the enterprise device(s) 140 or the service provider device(s) 142 of FIG. 1) and/or output by modeling logic (e.g., the modelling logic 122 of FIG. 1 or the model(s) described with reference to FIG. 2).

At 412, the constraints may be applied to the sequence of communications for different users. For example, the constraints may include legal or user preference constraints (e.g., is the communication to the user permitted or prohibited by applicable laws or regulations, has the user opted out of receiving communications from the sender, and the like). The constraints may be utilized to optimize the sequence of communications. For example, the application of the constraints to the sequence of communications may remove or prune sequences of communications corresponding to users for which the communications are not permitted (e.g., due to legal constraints, opt out preferences, or other constraints, such as communication thresholds). Application of the constraints may also be configured to rank the sequence of communications to produce a ranked sequence of communications 414. The ranked sequence of communications 414 produced at 412 may be include communications ranked according to one or more target metrics (e.g., revenue, response rates, etc.) in order to optimize the touchpoints (e.g., communications to users) while simultaneously minimizing the likelihood that the users receive too many communications. For example, where multiple communications are available to send to a user, the constraint-based ranking may prioritize the communications such that if all communications are not able to be transmitted, the communications with the highest ranking will be transmitted first and lower ranked communications may potentially not be transmitted (e.g., due to communication limits, user preferences, and the like). As shown above, harmonization based on entity priors (e.g., blocks 410-414) may hyper personalize and harmonize a sequence of communications, including prioritizing recommendations for transmission of the communications of one or more sequences of communications to the user while satisfying applicable constraints. As a result of the constraint-based ranking, a ranked sequence of communications may be created.

At 420, enterprise priors may be determined. The enterprise priors may correspond to constraints specified by an enterprise (e.g., an operator of the enterprise device(s) 140 of FIG. 1) that is seeking to transmit or have a third party (e.g., an operator of the service provider device(s) 142 of FIG. 1) transmit the sequences of communications to the recipients. For example, the enterprise priors may be associated with budget constraints (e.g., budget constraints for a campaign associated with the communications, etc.), delivery constraints (e.g., brand targets, delivery targets, delivery channels, etc.), rules (e.g., business rules, content rules, and the like), thresholds (e.g., capacity thresholds), or other constraints configured by the enterprise or other entity desiring to transmit the communications to users. In an aspect, one or more of the enterprise priors may be determined based on an enterprise level and may be utilized to determine communications across a portfolio and/or based on individual brand strategies. As a non-limiting example, the enterprise priors may be determined based on a portfolio of lawn and garden tools (e.g., lawnmowers, weed eaters, tillers, chainsaws, etc.) or may be determined based on a specific tool of the portfolio of lawn and garden tools.

At 422, the constraints derived from the enterprise priors may be applied to the sequence of communications to optimize the sequence of communications. For example, the constraints may include delivery parameters, which may be specified in terms of reach and frequency thresholds, configured to account for the nature of the content of communications. The set of constraints may be optimized based on models, historical patterns, compliance rates, or other metrics. Application of the constraints derived from the enterprise priors to the sequence of communications may produce a ranked sequence of communications 424, where the sequence of communications is ranked based on the enterprise priors, thereby ensuring that the constraints are satisfied and reflected in the ranked sequence of communications. The ranked sequence of communications may also take into account one or more thresholds, such as thresholds associated with an expected value (e.g., enterprise returns). For example, a return threshold may be evaluated for a communication and if the return threshold is not satisfied the communication may be assigned a lower ranking than another communication that satisfies the return threshold. In some aspects, affinities of the users may also be reflected in the ranked sequence of communications. For example, communications associated with advertisements for products may be prioritized or ranked (e.g., within the ranked sequence(s) of communications 424) according to an intended recipient's affinity for one brand of the product over another or even user affinities for receiving the communication from a particular source instead of other sources. In some aspects, the ranked sequence of communications 424 may also take into account proximity of the target recipient to subject matter of the communication(s), proximity of the user to an enterprise or service device that will deliver the communication(s), etc., or other factors. It is noted that ranking the sequence(s) of communications based on the entity and enterprise priors, as described above, may be performed for each intended recipient, thereby providing ranked sequences of communications for each recipient in a hyper personalized manner while ensuring that the applicable constraints are met. Utilizing the above-described techniques may improve the impact of the communication(s) and the likelihood that the desired outcome is achieved.

The ranked sequences of communications 414, 424 may be utilized to generate a final set of sequences of communications, at 440. The final set of sequences of communications may represent a set of communication sequences that has been optimized across multiple different factors (e.g., affinities, geographic proximity, historical communications and responses, user preferences, etc.) that contribute to an increased likelihood that a user (i.e., recipient of the communications) takes a particular action. For example, the final set of sequence recommendations, which are produced by overlaying a set of sequence recommendations (e.g., the set of sequence recommendations generated as described with reference to FIG. 4) with the entity and enterprise constraints, may represent an optimized sequence of communications that takes into account the rankings associated with each communication in a ranked sequences of communications 414, 424 corresponding to a specific recipient. Such customization provides for prioritization or ranking of communications in a sequence of communications that enables relevant communications to be targeted to specific users (i.e., recipients) in real time from external or existing programs in a hyper personalized manner that improves the impact of the communications and increases the likelihood of achieving a desired outcome with respect to the transmitted communications.

In some aspects, harmonization may be performed, at 430. Harmonization may be performed to orchestrate delivery of the communications in coordination with existing enterprise programs on a priority basis irrespective of the technologies utilized to facilitate delivery of the communications. For example, harmonization may enable communications to be provided via multiple communication channels and may enable the communications to be transmitted using a variety of delivery technologies (e.g., different e-mail software, voice communications technologies, automated voice response systems, and the like) and/or points of origin (e.g., different communications in the sequence of communications may be transmitted from different sources, such as an enterprise device or a service provider device, or different locations). An additional advantage provided by embodiments of the present disclosure is that the communications may be monitored, optimized, and transmitted without impacting existing enterprise communications delivery programs (i.e., the system 100 of FIG. 1 may co-exist with existing systems that may be generating communications from a centralized/HQ system).

Referring back to FIG. 1, the set of personalized communication sequences obtained by operations of the harmonization engine 126 may represent sequences of communications that have been hyper-personalized for each of the different users, as described above with reference to FIG. 4. The hyper personalization may significantly improve the impact that each communication in the sequence of communications has on the intended recipient and increase the likelihood of achieving the desired outcome. In some aspects, the computing device 110 may be configured to coordinate transmission of the sequence of communications to the target recipients. For example, the computing device 110 may be configured to schedule transmission of communications to each of the different users according to a personalized sequence of communications determined for a corresponding user (e.g., a communication to a first user may be based on a sequence of communications personalized for the first user and a communication to a second user may be based on a sequence of communications personalized for the second user). As described above, transmission of the sequence of communications may be configured based on timing parameters (e.g., waiting intervals, conversion intervals, etc.) that may limit the frequency of transmission and/or the amount of time that elapses between communications to a particular recipient.

In some aspects, rather than transmitting the communications from the computing device 110, the personalized sequences of communications may be transmitted to one of the third party devices. For example, the enterprise device(s) 140 may be associated with a manufacturer or retailer that sells a product and the personalized communication sequences may be part of an advertising campaign promoting the product. The computing device 110 may provide the personalized sequences of communications to the enterprise device(s) 140 and the enterprise device(s) 140 may control transmission of the communications to the users (e.g., users associated with the one or more recipient devices 144). In still other exemplary aspects, the computing device 110 may provide the personalized sequences of communications to the one or more recipient devices 144 based on information provided by one of the service provider devices 142 (e.g., a list of potential leads provided by a an advertising company) or the enterprise device(s) 140 (e.g., a list of users to receive the communications generated by a marketing department of the enterprise associated with the enterprise device(s) 140). In such an implementation, the enterprise devices 140 and/or the service provider devices 142 may control transmission of the communications to the users in accordance with the personalized sequence of communications determined by the computing device 110.

In addition to controlling timing for transmitting the communications, the personalized communications control an order in which communications of the sequence are transmitted. As described above, the order of transmission of the communications within the sequence may have an impact on the user and whether the desired outcome is achieved. For example, a first user may receive a first communication via a voice communication channel while a second user may receive the first communication via an e-mail communication channel. The particular order in which communications are delivered to each user may be specific to the user's preferences and configured to increase the impact that the communications have on the user. Thus, controlling transmission of specific communications (in accordance with the timing controls) may result in a higher rate of achieving the desired outcome.

Despite the above-describe capabilities and advantages, the computing device 110 may also implement additional optimization operations. For example, the computing device 110 may include a feedback engine 132 that may support operations for a feedback loop in which feedback from various participants supported by the system 100 may be received. The feedback engine 132 may use the feedback to refine the above-described processes, such as to receive new or updated preference information, update capacity or reach constraints (e.g., capacity for transmitting communications, geographic regions where communications are authorized for transmission, etc.), update the historical communication data, or other updates and refinements. The updated or refinements may then be utilized to optimize future sequences of events that may be more likely to achieve the desired outcomes and which may take into account changes in user behavior over time. It is noted that the phrase desired outcome is used herein to broadly define goals associated with use cases involving transmission of communication sequences. For example, in an advertising context the desired outcome may be a sale or conversion. However, embodiments of the system 100 are not limited to commercial-type use cases. For example, with the onset of COVID-19 many people have had to shelter in place and the techniques disclosed herein may be utilized to provide sequences of communications associated with remote wellness checks (e.g., the communications are configured to solicit a response from the recipient regarding a state of the recipient's health) or other types of communications that may be helpful in situations where persons are isolated from others.

As shown above, the system 100 may use historical communications data to group different users into clusters, such as clusters of users exhibiting similar behaviors, preferences, communication channel utilizations, and the like. The clusters may then be used to construct a model of the users (at a group level) that may be used to determine metrics associated with the impact that communications have on the users. The metrics may then be used to derive recommended sequences of communications for each group of users and then the recommended sequences of communications may be customized for each individual user. Such operations provide an improved framework for maximizing the impact that a sequence of communication has on users and may increase the user responsiveness to the communications.

Figure 5:
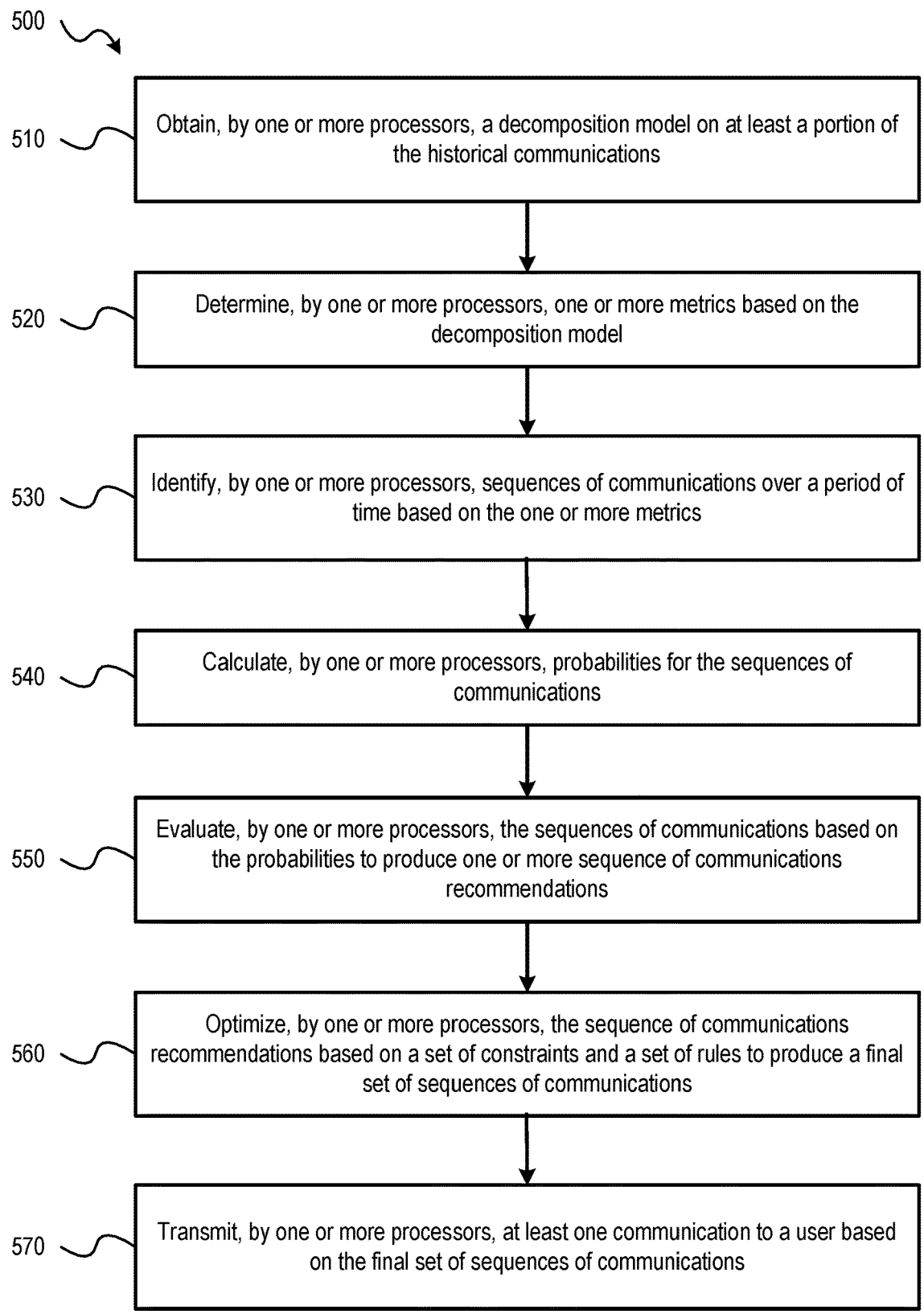
FIG. 5 is a flow diagram illustrating an example of a method for optimizing a sequence of communications over a plurality of communication channels or mediums in accordance with aspects of the present disclosure.

Referring to FIG. 5, a flow diagram illustrating an example of a method for optimizing a sequence of communications over a plurality of communication channels or mediums in accordance with aspects of the present disclosure is shown as a method 500. In some implementations, the operations of the method 500 may be stored as instructions (e.g., the instructions 116 of FIG. 1) that, when executed by one or more processors (e.g., the one or more processors of 112 of FIG. 1), cause the one or more processors to perform the operations of the method 500. In some implementations, the method 500 may be performed by a computing device, such as the computing device 110 of FIG. 1 or computing resources of a cloud-based system (e.g., cloud computing logic 152 of FIG. 1).

At step 510, the method 500 includes obtaining, by one or more processors, a decomposition model based on at least a portion of historical communications data. As described above with reference to FIG. 2, the decomposition model may be an impact decomposition model and the historical communications data may include data records associated with previous communications transmitted to users over a plurality of communication channels, such as voice communication channels (e.g., cellular voice communications, Voice over Internet Protocol (VoIP) communications, automated voice response (AVR) communications), e-mail communications, SMS or MMS communications, etc.). In some aspects, obtaining the decomposition model may include performing clustering based on the historical communications data to establish groups of users and their corresponding historical communications.

At step 520, the method 500 includes determining, by the one or more processors, one or more metrics based on the decomposition model. As described above, the one or more metrics may include half-life metrics, weight metrics, success interval metrics, or other metrics. In some aspects, additional metrics may be derived based on the decomposition model and/or the identified sequences of communications. At step 530, the method 500 includes identifying, by the one or more processors, sequences of communications over a period of time based on the one or more metrics, each of the sequences of communications comprising one or more communications transmitted via one or more communication channels of the plurality of communication channels. In some aspects, the sequences of communications over a period of time may be identified as described above with reference to blocks 228 and 230 of FIG. 2. In some aspects, additional data points may be derived based on the decomposition model and/or the identified sequences of communications, such as model coefficient and response curves, as described above with reference to FIG. 3.

At step 540, the method 500 includes calculating, by the one or more processors, probabilities for the sequences of communications. As described above with reference to FIG. 3, the probabilities may include a no sequence probability, which may represent a probability that an event occurs in the absence of any communications, and may include a transition probability, which may represent the likelihood that the event will be triggered as a result of transmission of a second communication subsequent to a first communication. In some aspects, an attribution penalty may also be calculated. The attribution penalty may be configured to attribute at least a portion of an impact of one communication to another communication, which may depend on the nature of communication channel, as described above with reference to FIG. 3. At step 550, the method 500 includes evaluating, by the one or more processors, the sequences of communications based on the probabilities to produce one or more sequence of communications recommendations. In aspects, the evaluation of the sequences of communications based on the probabilities may be performed as described above with reference to FIG. 3. In some aspects, final probabilities may be determine based on the one or more sequence of communications recommendations. For example, the final probabilities may be determined based on affinity analysis, as described with reference to blocks 330, 332 of FIG. 3.

At step 560, the method 500 includes optimizing, by the one or more processors, the sequence of communications recommendations based on a set of constraints and a set of rules to produce a final set of sequences of communications. As described above with reference to FIG. 4, the final set of sequences of communications may correspond to optimized communication sequences derived from the sequence of communications recommendations. For example, the set of constraints may be optimize the sequences of communications by ranking specific communications within the sequence and the set of rules may be configured to utilize affinities or other metrics (e.g., geo-proximity) to rank or prioritize the communications within the sequence. As described above with reference to FIG. 4, each of the optimized sequences of communications may be tuned to a specific user, which may increase the likelihood of that the event occurs as a result of at least one communication in the sequence of communications optimized for that specific user. It is noted that the sequence of communications recommendations may be determined at the group level (e.g., based at least in part on the clustering used to obtain the decomposition model), but that the various optimizations provided by the method 500 may modify the sequences of communications via the tuning such that users associated with a same cluster may have different final sequences of communications (e.g., a first user may have a sequence involving a voice communication followed by an e-mail and then an MMS message while a second user within the same cluster as the first user may has a sequence that involves an e-mail communication followed by a SMS communication followed by a voice communication and then an in-person communication). In this manner, hyper-personalized communication sequences may be generated that are more likely to trigger occurrences of an event as compared to previous approaches.

At step 570, the method 500 includes transmitting, by the one or more processors, at least one communication to a user based on the final set of sequences of communications. It is noted that in some aspects, the optimized sequences of communications may be transmitted to a third party and the third party may transmit the sequence of communications to the users.

It is noted that other types of devices and functionality may be provided according to aspects of the present disclosure and discussion of specific devices and functionality herein have been provided for purposes of illustration, rather than by way of limitation. It is noted that the operations of the method 500 of FIG. 5 may be performed in any order. It is also noted that the method 500 of FIG. 5 may also include other functionality or operations consistent with the description of the operations of the system 100 of FIG. 1 and the operations described with respect to FIGS. 2-4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product. In some aspects, systems according to the present disclosure may include storage media for codes like cloud, git repositories for universal, on the fly, and digital access on the go in a very easy manner and allow access across multiple devices and multiple entities.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A system comprising:
   a memory storing data records associated with historical communications transmitted over a plurality of communication channels; and
   one or more processors communicatively coupled to the memory, the one or more processors configured to:
      obtain a decomposition model on at least a portion of the historical communications;
      determine one or more metrics based on the decomposition model;
      identify sequences of communications over a period of time based on the one or more metrics, each of the sequences of communications comprising one or more communications transmitted via one or more communication channels of the plurality of communication channels;
      calculate probabilities for the sequences of communications, wherein the probabilities comprise at least a no sequence probability representing a probability that an event occurs in the absence of any communications;
      evaluate the sequences of communications based on the probabilities to produce one or more sequence of communications recommendations;
      optimize the sequence of communications recommendations based on a set of constraints and a set of rules to produce a final set of sequences of communications, wherein the final set of sequences of communications correspond to optimized communication sequences derived from the sequence of communications recommendations; and
      transmit at least one communication to a user based on the final set of sequences of communications.

2. The system of claim 1, wherein the one or more metrics comprise a half-life metric determined based on the decomposition model, the half-life metric indicating a decaying impact of a communication over time.

3. The system of claim 1, wherein the at least one processor is configured to: receive feedback based on the at least one communication transmitted to the user; and
   update the decomposition model, the probabilities, the set of constraints, the set of rules, or a combination thereof based on the feedback.

4. The system of claim 1, wherein the set of constraints are configured to restrict a number of communications that are sent to the user during a time period, and wherein the set of rules are configured to at least control transmission of communications to the user based at least in part on geographic proximity factors.

5. The system of claim 1, wherein the one or more metrics comprise an attribution penalty configured to attribute at least a portion of an impact of one communication to another communication, wherein the one communication occurs subsequent to the other communication, and wherein the occurrence of the event is triggered in response to the one communication.

6. The system of claim 1, wherein the probabilities comprise a transition probability representing a probability that the occurrence of the event is triggered as a result of transmission of a second communication subsequent to a first communication.

7. The system of claim 1, wherein the one or more processors are configured to determine one or more clusters, each of the one or more clusters corresponding to a group of users identified as receiving communications based on the historical communications, wherein the decomposition model is based on the one or more clusters, wherein the sequences of communications over the period of time identified based on the one or more metrics are associated with the group of users corresponding to a particular cluster of the one or more clusters, and wherein the final set of sequences of communications correspond to sequences of communications optimized for each user of the particular cluster individually.

8. The system of claim 1, wherein the one or more processors are configured to transmit one or more additional communications to the user subsequent to transmission of at least one communication, wherein the one or more additional communications and a timing for transmission of the one or more additional communications are specified in the final set of sequences of communications according to optimizations determined based on the set of constraints and the set of rules.

9. A non-transitory computer-readable storage medium storing instructions that, when executed by one or more processors, cause the one or more processors to perform operations comprising:
   obtaining a decomposition model based on at least a portion of historical communications data, the historical communications data comprising data records associated with previous communications transmitted over a plurality of communication channels;
   determining one or more metrics based on the decomposition model;
   identifying sequences of communications over a period of time based on the one or more metrics, each of the sequences of communications comprising one or more communications transmitted via one or more communication channels of the plurality of communication channels;
   calculating probabilities for the sequences of communications, wherein the probabilities are associated with an occurrence of an event triggered in response to at least one communication of a sequence of communications, and wherein the probabilities comprise a no sequence probability and a transition probability;
   evaluating the sequences of communications based on the probabilities to produce one or more sequence of communications recommendations;
   optimizing the sequence of communications recommendations based on a set of constraints and a set of rules to produce a final set of sequences of communications, wherein the final set of sequences of communications correspond to optimized communication sequences derived from the sequence of communications recommendations; and
   transmitting at least one communication to a user based on the final set of sequences of communications.

10. The non-transitory computer-readable storage medium of claim 9, wherein the one or more metrics comprise a half-life metric determined based on the decomposition model, the half-life metric indicating a decaying impact of a communication over time.

11. The non-transitory computer-readable storage medium of claim 9, wherein the operations comprise:
receiving feedback based on the at least one communication transmitted to the user; and
updating the decomposition model, the probabilities, the set of constraints, the set of rules, or a combination thereof based on the feedback.

12. The non-transitory computer-readable storage medium of claim 9, wherein the set of constraints are configured to restrict a number of communications that are sent to the user during a time period, and wherein the set of rules are configured to at least control transmission of communications to the user based at least in part on geographic proximity factors.

13. The non-transitory computer-readable storage medium of claim 9, wherein the one or more metrics comprise an attribution penalty configured to attribute at least a portion of an impact of one communication to another communication, wherein the one communication occurs subsequent to the other communication, and wherein the occurrence of the event is triggered in response to the one communication.

14. The non-transitory computer-readable storage medium of claim 9, wherein the no sequence probability represents a probability that the occurrence of the event is triggered in the absence of any communications, and wherein the transition probability represents a probability that the occurrence of the event is triggered as a result of transmission of a second communication subsequent to a first communication.

15. The non-transitory computer-readable storage medium of claim 9, wherein the operations comprise determining one or more clusters, each of the one or more clusters corresponding to a group of users identified as receiving communications based on the historical communications, wherein the decomposition model is based on the one or more clusters, wherein the sequences of communications over the period of time identified based on the one or more metrics are associated with the group of users corresponding to a particular cluster of the one or more clusters, and wherein the final set of sequences of communications correspond to sequences of communications optimized for each user of the particular cluster individually.

16. The non-transitory computer-readable storage medium of claim 9, wherein the one or more processors are configured to transmit one or more additional communications to the user subsequent to transmission of the at least one communication, wherein the one or more additional communications and a timing for transmission of the one or more additional communications are specified in the final set of sequences of communications according to optimizations determined based on the set of constraints and the set of rules.

17. A method comprising:
obtaining, by one or more processors, a decomposition model based on at least a portion of historical communications data, the historical communications data comprising data records associated with previous communications transmitted over a plurality of communication channels;
determining, by the one or more processors, one or more metrics based on the decomposition model;
identifying, by the one or more processors, sequences of communications over a period of time based on the one or more metrics, each of the sequences of communications comprising one or more communications transmitted via one or more communication channels of the plurality of communication channels;
calculating, by the one or more processors, probabilities for the sequences of communications, wherein the probabilities are associated with an occurrence of an event triggered in response to at least one communication of a sequence of communications, and wherein the probabilities comprise a no sequence probability and a transition probability;
evaluating, by the one or more processors, the sequences of communications based on the probabilities to produce one or more sequence of communications recommendations;
optimizing, by the one or more processors, the sequence of communications recommendations based on a set of constraints and a set of rules to produce a final set of sequences of communications, wherein the final set of sequences of communications correspond to optimized communication sequences derived from the sequence of communications recommendations; and
transmitting, by the one or more processors, at least one communication to a user based on the final set of sequences of communications.

18. The method of claim 17, wherein the one or more metrics comprise a half-life metric and an attribution penalty determined based on the decomposition model, wherein the half-life metric indicates a decaying impact of a communication over time, and wherein the attribution penalty is configured to attribute at least a portion of an impact of one communication to another communication, wherein the one communication occurs subsequent to the other communication, and wherein the occurrence of the event is triggered in response to the one communication.

19. The method of claim 17, further comprises:
receiving feedback based on the at least one communication transmitted to the user; and
updating the decomposition model, the probabilities, the set of constraints, the set of rules, or a combination thereof based on the feedback.

20. The method of claim 17, further comprises determining one or more clusters, each of the one or more clusters corresponding to a group of users identified as receiving communications based on the historical communications, wherein the decomposition model is based on the one or more clusters, wherein the sequences of communications over the period of time identified based on the one or more metrics are associated with the group of users corresponding to a particular cluster of the one or more clusters, and wherein the final set of sequences of communications correspond to sequences of communications optimized for each user of the particular cluster individually.

* * * * *